(12) United States Patent
Testa et al.

(10) Patent No.: US 10,250,350 B2
(45) Date of Patent: Apr. 2, 2019

(54) OPTICAL SWITCH, OPTICAL ADD-DROP MULTIPLEXER, COMMUNICATION NETWORK NODE AND COMMUNICATION NETWORK

(71) Applicant: Telefonaktiebolaget LM Ericsson (publ), Stockholm (SE)

(72) Inventors: Francesco Testa, Pisa (IT); Giulio Bottari, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/915,001

(22) PCT Filed: Sep. 4, 2013

(86) PCT No.: PCT/EP2013/068250
§ 371 (c)(1),
(2) Date: Feb. 26, 2016

(87) PCT Pub. No.: WO2015/032424
PCT Pub. Date: Mar. 12, 2015

(65) Prior Publication Data
US 2016/0204892 A1    Jul. 14, 2016

(51) Int. Cl.
*H04J 14/02* (2006.01)
*H04Q 11/00* (2006.01)

(52) U.S. Cl.
CPC ...... *H04J 14/0212* (2013.01); *H04J 14/0204* (2013.01); *H04J 14/0217* (2013.01);
(Continued)

(58) Field of Classification Search
None
See application file for complete search history.

(56) References Cited

U.S. PATENT DOCUMENTS 6,115,517 A * 9/2000 Shiragaki ............ H04J 14/0212
385/16
6,411,752 B1 * 6/2002 Little ................. G02B 6/12002
385/17
(Continued)

FOREIGN PATENT DOCUMENTS

WO   WO 02101421 A2 * 12/2002 ........... G02B 6/2934
WO   WO-02101421 A2 * 12/2002 ........... G02B 6/2934
WO   WO 2012/123022 A1    9/2012

OTHER PUBLICATIONS

Antoniades et al., WDM Systems and Networks, 2012, Springer+Business Media, LLC 2012, pp. 75-78.*
(Continued)

*Primary Examiner* — Kenneth N Vanderpuye
*Assistant Examiner* — Jai M Lee
(74) *Attorney, Agent, or Firm* — Baker Botts, LLP

(57) ABSTRACT

An optical switch (10) comprising: input ports (12, 14) arranged to receive optical signals from directions D1 to Dn; output ports (16, 18) arranged to output optical signals to the said directions; drop ports (20); add ports (22); a first switch array (24) arranged to receive from a first said input port (12) optical signals at a plurality of wavelengths, and comprising switch elements (26) each arranged to selectively direct optical signals to a respective drop port. The optical switch (10) further comprising optical filters (28), each arranged to receive from the first input port optical signals having bypass wavelengths, each optical filter arranged to transmit to a respective one of the output ports (18) optical signals at different bypass wavelengths; and a second switch array (30) arranged to receive from the other input ports (14) optical signals at some of said wavelengths, the second switch array
(Continued)

comprising a plurality of switch elements (32) arranged to selectively add optical signals received from the add ports at others of said wavelengths.

10 Claims, 8 Drawing Sheets

(52) U.S. Cl.
CPC ...... *H04J 14/0219* (2013.01); *H04Q 11/0005* (2013.01); *H04Q 11/0071* (2013.01); *H04Q 2011/006* (2013.01); *H04Q 2011/0009* (2013.01); *H04Q 2011/0015* (2013.01); *H04Q 2011/0035* (2013.01); *H04Q 2011/0039* (2013.01); *H04Q 2011/0052* (2013.01)

(56) References Cited

U.S. PATENT DOCUMENTS

| | | | | |
|---|---|---|---|---|
| 6,466,341 | B1* | 10/2002 | Lumish | G02B 6/29367 398/82 |
| 6,519,064 | B1* | 2/2003 | Fatehi | H04J 14/021 398/83 |
| 6,909,824 | B1* | 6/2005 | Messica | G02B 6/12007 385/15 |
| 6,947,670 | B1* | 9/2005 | Korotky | H04J 14/0204 398/59 |
| 2008/0131130 | A1* | 6/2008 | Chang | H04J 14/0212 398/83 |
| 2008/0193133 | A1* | 8/2008 | Krug | G02B 6/12007 398/83 |
| 2009/0220228 | A1* | 9/2009 | Popovic | G02B 6/12007 398/48 |
| 2010/0124391 | A1* | 5/2010 | Feuer | H04J 14/0204 385/24 |
| 2010/0142961 | A1* | 6/2010 | Wisseman | H04J 14/0212 398/83 |
| 2011/0076016 | A1* | 3/2011 | Wisseman | H04J 14/0204 398/48 |
| 2011/0286746 | A1* | 11/2011 | Ji | H04J 14/0204 398/83 |
| 2012/0251042 | A1* | 10/2012 | Julien | H04Q 11/0005 385/17 |
| 2014/0003810 | A1* | 1/2014 | Dong | G02F 1/011 398/48 |
| 2015/0168803 | A1* | 6/2015 | Xu | G02F 1/353 359/332 |

OTHER PUBLICATIONS

Geuzebroek et al. "8 Ring-Resonator-Based Wavelength Filters"; 8.2 Fundamentals of Microring Resonators—2006.

Poon et al. "Cascaded Microresonator-Based Matrix Switch for Silicon On-Chip Optical Interconnection"; Proceedings of the IEEE; vol. 97, No. 7—Jul. 2009.

Gringeri et al. "Flexible Architectures for Optical Transport Nodes and Networks"; 100 Gigabit Ethernet; IEEE Communications Magazine—Jul. 2010.

Iovanna et al. "Packet-Optical Integration Nodes for Next Generation Transport Networks"; vol. 4, No. 10/ J. Opt. Commun. Netw.—Oct. 2012.

International Search Report for International application No. PCT/EP2013/068520—dated Apr. 15, 2014.

International Search Report for International application No. PCT/EP2013/068250—dated Apr. 15, 2014.

* cited by examiner

OPTICAL SWITCH, OPTICAL ADD-DROP MULTIPLEXER, COMMUNICATION NETWORK NODE AND COMMUNICATION NETWORK

PRIORITY

This nonprovisional application is a U.S. National Stage Filing under 35 U.S.C. § 371 of International Patent Application Serial No. PCT/EP2013/068250, filed Sep. 4, 2013, and entitled "Optical Switch, Optical Add-Drop Multiplexer, Communication Network Node and Communication Network."

TECHNICAL FIELD

The invention relates to an optical switch, an optical add-drop multiplexer comprising the optical switch, a communication network node comprising the optical add-drop multiplexer and a communication network comprising the communication network node.

BACKGROUND

The use of dense wavelength division multiplexing, DWDM, technology in mobile backhaul systems is required to cope with an increasing volume of traffic, especially when it is mixed with wire line traffic in a convergence scenario. Mobile Backhaul, MBH, is a multi-purpose transport network that connects base stations to network controllers within a geographical coverage area. MBH transport function is crucial in mobile networks and if not well planned and structured it can pose a real bottleneck in a radio access network, RAN. MBH is conventionally divided in two sections: low RAN, LRAN, the cell site access section, and high RAN, HRAN, the part of the network that collects, aggregates, and concentrates traffic from LRAN for connecting to the radio controllers. LRAN can be based on microwave, copper of optical fibre links arranged in point to point or ring topologies. HRAN is commonly based on optical fibre links arranged in a ring topology. However meshed HRANs can be used to increase the level of resource sharing and to improve the level of resiliency (to withstand multiple failures).

The introduction of differentiated broadband services requiring low latency, the increase of the traffic load, the convergence of the mobile and fixed infrastructures, the need for site consolidation, and energy saving are all reasons calling for the introduction of an optical solution in radio access and backhaul networks, where packet processing is implemented at the access and metro edge of the network and intermediate channel add-drop and ring interconnection is performed at the physical layer in the optical domain. However, conventional optical technologies and node architectures are not suitable for MBH due to their cost and complexity. E. J. Klein et al "Densely integrated microring resonator based photonic devices for use in access networks", Optics Express, pages 10346-10355, vol. 15, no. 16, 6 Aug. 2007, reports two reconfigurable optical add-drop multiplexers and a 1×4×4 reconfigurable wavelength-router based on thermally tuneable vertically coupled micro-ring resonators fabricated in $Si_3N_4/SiO_2$ for use in access networks.

SUMMARY

It is an object to provide an improved optical switch. It is a further object to provide an improved optical add-drop multiplexer. It is a further object to provide an improved communication network node. It is a further object to provide an improved communication network.

A first aspect of the invention provides an optical switch comprising a plurality of input ports, a plurality of output ports, a plurality of drop ports, a plurality of add ports, a first switch array, a plurality of optical filters and a second switch array. The input ports are each arranged to receive optical signals from a different one of a plurality of directions. The output ports are each arranged to output optical signals to a different one of the plurality of directions. The first switch array is arranged to receive from a first said input port optical signals at a plurality of wavelengths. The first switch array comprises a plurality of switch elements each arranged to selectively direct optical signals at a different one of said wavelengths to a respective drop port. The optical filters are each arranged to receive from the first input port optical signals having wavelengths to be bypassed by the optical switch. Each optical filter is arranged to transmit to a respective one of the output ports optical signals at different ones of said wavelengths. The second switch array is arranged to receive from the other said input ports optical signals at some of said wavelengths. The second switch array comprises a plurality of switch elements each arranged to selectively add optical signals received from a respective add port at a different one of others of said wavelengths.

The optical switch architecture may enable it to be manufactured at very low cost, enabling the optical switch to be used in mobile backhaul networks. The optical switch architecture may enable transparent and energy efficient optical bypass of express channels.

In an embodiment, each optical filter comprises a plurality of switch elements. Each switch element of each optical filter is arranged to selectively transmit optical signals at a different one of said wavelengths to be output at the respective output port.

Using switch elements to form the optical filters may enable the optical switch to be constructed using a minimum number of different optical devices, which may simplify the manufacturing process and may minimise the cost of the optical switch.

In an embodiment, each switch element comprises an optical resonator and a control element. Each optical resonator has a respective preselected resonance wavelength. Each optical resonator has an active state and an inactive state. In the active state, each optical resonator acts on optical signals at its respective resonance wavelength. In the inactive state, the optical resonator does not act on optical signals at any of the plurality of wavelengths. The control element is arranged to receive a respective control signal configured to cause it to switch the optical resonator between the active and inactive states. In the active state the switch elements of the first switch array couple optical signals to the respective drop port. In the active state the switch elements of the second switch array add optical signals received from the respective add port to the optical signals received from the other input ports. In the active state the switch elements of the optical filters remove optical signals at wavelengths that are not to be output from their respective output port.

An optical resonator based switch element, which does not act on optical signals having bypass wavelengths, may enable transparent and energy efficient optical bypass of express channels.

In an embodiment, the resonance wavelength of each optical resonator is selected from a respective preselected wavelength range.

In an embodiment, the optical resonator is a micro-ring resonator. Use of micro-ring resonators may give the optical coloured operation of the drop and add ports, and may enable photonic integrated fabrication, minimising cost, power consumption and footprint.

In an embodiment, the optical resonator is one of a magneto-optical resonator and an electro-optic resonator In an embodiment, the optical switch comprises an optical splitter, and the first switch array is provided between the first input and the optical splitter and the optical filters are provided after the optical splitter. The optical splitter is arranged to receive optical signals that have not been dropped by the first switch array, the optical splitter is arranged to split each said optical signal into a plurality of replica optical signals and the optical splitter is arranged to deliver a respective replica optical signal to each optical filter.

Locating the first switch array before the optical splitter may ensure that optical signals that are dropped have the maximum available optical power and may ensure that only optical signals at wavelengths to be bypassed, express optical channels, are transmitted to the optical filters for routing to the respective output port. By delivering a replica of each of the optical signals that have not been dropped, i.e. those which are to be bypassed by the optical switch, any of the optical signals being bypassed can be output to any of the output ports. The optical switch may therefore provide directionless routing of bypass optical signals.

In an embodiment, the optical switch comprises an optical splitter and the first switch array and the optical filters are provided after the optical splitter. The optical splitter is arranged to receive the optical signals from the first input port, the optical splitter is arranged to split each said optical signal into a plurality of replica optical signals and the optical splitter is arranged to deliver a respective replica optical signal to each optical filter and to the first switch array. The first switch array is arranged additionally to operate as one of the optical filters, also dropping optical signals which are not to be output to its respective output port.

Configuring the first switch array both to couple optical signals to be dropped to their respective drop port and to couple optical signals which are not to be output to its respective output port out of the respective replica optical signals may enable the optical switch to be constructed with fewer optical devices, in particular fewer switch elements. This may simplify manufacture of the optical switch and may reduce its cost.

In an embodiment, the optical switch comprises at least three input ports and the same number of output ports. Each input port is arranged to receive optical signals from a different one of the at least three directions. Each output port is arranged to output optical signals to a different one of the said directions.

In an embodiment, the optical switch comprises a first optical amplifier provided before the first switch array.

In an embodiment, the optical switch comprises a second optical amplifier provided after the second switch array.

An optical amplifier may not be needed if there are four directions or less, since loss in the optical switch may be acceptable. Adding an optical amplifier may increase the number of directions to above four.

In an embodiment, each optical amplifier is one of a semiconductor optical amplifier and an erbium doped fibre amplifier.

In an embodiment, the optical switch further comprises a switch controller arranged selectively to generate and transmit a drop control signal, an optical filter control signal and an add control signal. The drop control signal comprises instructions to cause each switch element of the first switch array having a resonance wavelength corresponding to the wavelength of an optical signal to be dropped to enter the active state. The optical filter control signal comprises instructions to cause each switch element having a resonance wavelength corresponding to the wavelength of an optical signal not to be transmitted to the respective output port to enter the active state. The add control signal comprises instructions to cause each switch element of the second switch array having a resonance wavelength corresponding to the wavelength of an optical signal to be added to enter the active state.

In an embodiment, the switch controller is arranged to configure the said control signals to avoid contentions between optical signals of the same wavelength. Coordination of the operation of the switch elements may enable symmetrical operation of the optical switch.

In an embodiment, the switch controller is arranged to receive a switching signal comprising switching information indicating each wavelength to be dropped, each wavelength to be added and a respective output direction for each wavelength to be bypassed. The switch controller may receive switching information from a control plane.

In an embodiment, the number of optical switch elements in each switch array is the same as the plurality of wavelengths. Each optical switch element may be dedicated to a single wavelength, giving the optical switch coloured operation.

In an embodiment, the optical switch comprises an optical combiner arranged to receive from the other said input ports optical signals at some of said wavelengths. The optical combiner is arranged to combine said optical signals and to deliver the combined optical signals to the second switch array.

In an embodiment, the optical switch is fabricated as a photonic integrated device. This may enable the optical switch to be manufactured at a low cost, less than the cost of conventional wavelength selective switches, which may make it economically viable to use the optical switch within mobile backhaul networks.

A second aspect of the invention provides an optical add-drop multiplexer comprising a plurality of optical switches. Each optical switch comprises a plurality of input ports, a plurality of output ports, a plurality of drop ports, a plurality of add ports, a first switch array, a plurality of optical filters and a second switch array. The input ports are each arranged to receive optical signals from a different one of a plurality of directions. The output ports are each arranged to output optical signals to a different one of the plurality of directions. The first switch array is arranged to receive from a first said input port optical signals at a plurality of wavelengths. The first switch array comprises a plurality of switch elements each arranged to selectively direct optical signals at a different one of said wavelengths to a respective drop port. The optical filters are each arranged to receive from the first input port optical signals having wavelengths to be bypassed by the optical switch. Each optical filter is arranged to transmit to a respective one of the output ports optical signals at different ones of said wavelengths. The second switch array is arranged to receive from the other said input ports optical signals at some of said wavelengths. The second switch array comprises a plurality of switch elements each arranged to selectively add optical signals received from a respective add port at a different one of others of said wavelengths.

The architecture of the optical switches enables a multi-directional optical add-drop multiplexer, OADM, to be provided which may meet the needs of mobile backhaul networks and which may be manufactured at a cost acceptable for with this network segment, where the large number of OADMs imposes a limit on the cost per OADM. The OADM architecture may enable at least 1:1 protection switching to be implemented.

In an embodiment, each optical filter comprises a plurality of switch elements. Each switch element of each optical filter is arranged to selectively transmit optical signals at a different one of said wavelengths to be output at the respective output port.

Using switch elements to form the optical filters may enable the optical switches to be constructed using a minimum number of different optical devices, which may simplify the manufacturing process and may minimise the cost of the OADM.

In an embodiment, each switch element comprises an optical resonator and a control element. Each optical resonator has a respective preselected resonance wavelength. Each optical resonator has an active state and an inactive state. In the active state, each optical resonator acts on optical signals at its respective resonance wavelength. In the inactive state, the optical resonator does not act on optical signals at any of the plurality of wavelengths. The control element is arranged to receive a respective control signal configured to cause it to switch the optical resonator between the active and inactive states. In the active state the switch elements of the first switch array couple optical signals to the respective drop port. In the active state the switch elements of the second switch array add optical signals received from the respective add port to the optical signals received from the other input ports. In the active state the switch elements of the optical filters remove optical signals at wavelengths that are not to be output from their respective output port.

An optical resonator based switch element, which does not act on optical signals having bypass wavelengths, may enable transparent and energy efficient optical bypass of express channels by the OADM.

In an embodiment, the resonance wavelength of each optical resonator is selected from a respective preselected wavelength range.

In an embodiment, the optical resonator is a micro-ring resonator. Use of micro-ring resonators may give the OADM optical coloured operation of the drop and add ports, and may enable photonic integrated fabrication of the optical switches, minimising cost, power consumption and footprint of the OADM.

In an embodiment, the optical resonator is one of a magneto-optical resonator and an electro-optic resonator.

In an embodiment, at least one optical switch comprises an optical splitter, and the first switch array is provided between the first input and the optical splitter and the optical filters are provided after the optical splitter. The optical splitter is arranged to receive optical signals that have not been dropped by the first switch array, the optical splitter is arranged to split each said optical signal into a plurality of replica optical signals and the optical splitter is arranged to deliver a respective replica optical signal to each optical filter.

Locating the first switch array before the optical splitter may ensure that optical signals that are dropped have the maximum available optical power and may ensure that only optical signals at wavelengths to be bypassed, express optical channels, are transmitted to the optical filters for routing to the respective output port. By delivering a replica of each of the optical signals that have not been dropped, i.e. those which are to be bypassed by the optical switch, any of the optical signals being bypassed can be output to any of the output ports. The OADM may therefore provide directionless routing of bypass optical signals.

In an embodiment, at least one optical switch comprises an optical splitter and the first switch array and the optical filters are provided after the optical splitter. The optical splitter is arranged to receive the optical signals from the first input port, the optical splitter is arranged to split each said optical signal into a plurality of replica optical signals and the optical splitter is arranged to deliver a respective replica optical signal to each optical filter and to the first switch array. The first switch array is arranged additionally to operate as one of the optical filters, also dropping optical signals which are not to be output to its respective output port.

Configuring the first switch array both to couple optical signals to be dropped to their respective drop port and to couple optical signals which are not to be output to its respective output port out of the respective replica optical signals may enable the optical switches to be constructed with fewer optical devices, in particular fewer switch elements. This may simplify manufacture of the OADM and may reduce its cost.

In an embodiment, the optical switches each comprise at least three input ports and the same number of output ports. Each input port is arranged to receive optical signals from a different one of the at least three directions. Each output port is arranged to output optical signals to a different one of the said directions.

In an embodiment, at least one optical switch comprises a first optical amplifier provided before the first switch array.

In an embodiment, at least one optical switch comprises a second optical amplifier provided after the second switch array.

An optical amplifier may not be needed if there are four directions or less, since loss in the optical switches may be acceptable. Adding an optical amplifier may increase the number of directions to above four.

In an embodiment, each optical amplifier is one of a semiconductor optical amplifier and an erbium doped fibre amplifier.

In an embodiment, the optical switch further comprises a switch controller arranged selectively to generate and transmit a drop control signal, an optical filter control signal and an add control signal. The drop control signal comprises instructions to cause each switch element of the first switch array having a resonance wavelength corresponding to the wavelength of an optical signal to be dropped to enter the active state. The optical filter control signal comprises instructions to cause each switch element having a resonance wavelength corresponding to the wavelength of an optical signal not to be transmitted to the respective output port to enter the active state. The add control signal comprises instructions to cause each switch element of the second switch array having a resonance wavelength corresponding to the wavelength of an optical signal to be added to enter the active state.

In an embodiment, the switch controller is arranged to configure the said control signals to avoid contentions between optical signals of the same wavelength. Coordination of the operation of the switch elements may enable symmetrical operation of each optical switch.

In an embodiment, the switch controller is arranged to receive a switching signal comprising switching information indicating each wavelength to be dropped, each wavelength to be added and a respective output direction for each wavelength to be bypassed. The switch controller may receive switching information from a control plane.

In an embodiment, the number of optical switch elements in each switch array is the same as the plurality of wavelengths. Each optical switch element may be dedicated to a single wavelength, giving the optical switch coloured operation.

In an embodiment, at least one optical switch comprises an optical combiner arranged to receive from the other said input ports optical signals at some of said wavelengths. The optical combiner is arranged to combine said optical signals and to deliver the combined optical signals to the second switch array.

In an embodiment, the optical switches are fabricated as photonic integrated devices. This may enable the optical switches to be manufactured at a low cost, less than the cost of conventional wavelength selective switches, and may therefore enable the OADM to be manufactured at a lower cost, which may make it economically viable to use the OADM within mobile backhaul networks.

In an embodiment, the optical add-drop multiplexer further comprises an electrical cross-point switch, optical to electrical signal conversion apparatus and electrical to optical signal conversion apparatus. The optical to electrical signal conversion apparatus is coupled between the optical switches and the electrical cross-point switch. The electrical to optical signal conversion apparatus is coupled between the electrical cross-point switch and the optical switches.

The electrical cross-point switch may enable the OADM to operate with colourless and directionless behaviour. The electrical cross-point switch may add flexibility to the OADM, by cross-connecting signals in the electrical domain.

In an embodiment, the optical add-drop multiplexer comprises a controller arranged in communication with the switch controller of each optical switch. The controller may enable coordination of the optical switches and their respective switch elements, and may avoid contentions between optical channels of the same wavelength.

In an embodiment, the controller is arranged to receive a routing signal comprising routing information indicating each wavelength to be dropped, each wavelength to be added and a respective output direction for each wavelength to be bypassed.

A third aspect of the invention provides a communication network node comprising an optical add-drop multiplexer. The optical add-drop multiplexer comprises a plurality of optical switches. Each optical switch comprises a plurality of input ports, a plurality of output ports, a plurality of drop ports, a plurality of add ports, a first switch array, a plurality of optical filters and a second switch array. The input ports are each arranged to receive optical signals from a different one of a plurality of directions. The output ports are each arranged to output optical signals to a different one of the plurality of directions. The first switch array is arranged to receive from a first said input port optical signals at a plurality of wavelengths. The first switch array comprises a plurality of switch elements each arranged to selectively direct optical signals at a different one of said wavelengths to a respective drop port. The optical filters are each arranged to receive from the first input port optical signals having wavelengths to be bypassed by the optical switch. Each optical filter is arranged to transmit to a respective one of the output ports optical signals at different ones of said wavelengths. The second switch array is arranged to receive from the other said input ports optical signals at some of said wavelengths. The second switch array comprises a plurality of switch elements each arranged to selectively add optical signals received from a respective add port at a different one of others of said wavelengths.

The architecture of the optical switches enables a multi-directional node to be provided which may meet the needs of mobile backhaul networks and which may be manufactured at a cost acceptable for with this network segment, where the large number of nodes imposes a limit on the cost per node. The node architecture may enable at least 1:1 protection switching to be implemented. The node may be used to interconnect two or more ring networks or to build a meshed network. In both cases, a failure recovery scheme can be easily implemented.

In an embodiment, each optical filter comprises a plurality of switch elements. Each switch element of each optical filter is arranged to selectively transmit optical signals at a different one of said wavelengths to be output at the respective output port.

Using switch elements to form the optical filters may enable the optical switches to be constructed using a minimum number of different optical devices, which may simplify the manufacturing process and may minimise the cost of the node.

In an embodiment, each switch element comprises an optical resonator and a control element. Each optical resonator has a respective preselected resonance wavelength. Each optical resonator has an active state and an inactive state. In the active state, each optical resonator acts on optical signals at its respective resonance wavelength. In the inactive state, the optical resonator does not act on optical signals at any of the plurality of wavelengths. The control element is arranged to receive a respective control signal configured to cause it to switch the optical resonator between the active and inactive states. In the active state the switch elements of the first switch array couple optical signals to the respective drop port. In the active state the switch elements of the second switch array add optical signals received from the respective add port to the optical signals received from the other input ports. In the active state the switch elements of the optical filters remove optical signals at wavelengths that are not to be output from their respective output port.

An optical resonator based switch element, which does not act on optical signals having bypass wavelengths, may enable transparent and energy efficient optical bypass of express channels by the node.

In an embodiment, the resonance wavelength of each optical resonator is selected from a respective preselected wavelength range.

In an embodiment, the optical resonator is a micro-ring resonator. Use of micro-ring resonators may give the OADM optical coloured operation of the drop and add ports, and may enable photonic integrated fabrication of the optical switches, minimising cost, power consumption and footprint of the node.

In an embodiment, the optical resonator is one of a magneto-optical resonator and an electro-optic resonator.

In an embodiment, at least one optical switch comprises an optical splitter, and the first switch array is provided between the first input and the optical splitter and the optical filters are provided after the optical splitter. The optical splitter is arranged to receive optical signals that have not been dropped by the first switch array, the optical splitter is arranged to split each said optical signal into a plurality of replica optical signals and the optical splitter is arranged to deliver a respective replica optical signal to each optical filter.

Locating the first switch array before the optical splitter may ensure that optical signals that are dropped have the maximum available optical power and may ensure that only optical signals at wavelengths to be bypassed, express optical channels, are transmitted to the optical filters for routing to the respective output port. By delivering a replica of each of the optical signals that have not been dropped, i.e. those which are to be bypassed by the optical switch, any of the optical signals being bypassed can be output to any of the output ports. The node may therefore provide directionless routing of bypass optical signals.

In an embodiment, at least one optical switch comprises an optical splitter and the first switch array and the optical filters are provided after the optical splitter. The optical splitter is arranged to receive the optical signals from the first input port, the optical splitter is arranged to split each said optical signal into a plurality of replica optical signals and the optical splitter is arranged to deliver a respective replica optical signal to each optical filter and to the first switch array. The first switch array is arranged additionally to operate as one of the optical filters, also dropping optical signals which are not to be output to its respective output port.

Configuring the first switch array both to couple optical signals to be dropped to their respective drop port and to couple optical signals which are not to be output to its respective output port out of the respective replica optical signals may enable the optical switches to be constructed with fewer optical devices, in particular fewer switch elements. This may simplify manufacture of the OADM and may reduce its cost.

In an embodiment, the optical switches each comprise at least three input ports and the same number of output ports. Each input port is arranged to receive optical signals from a different one of the at least three directions. Each output port is arranged to output optical signals to a different one of the said directions.

In an embodiment, at least one optical switch comprises a first optical amplifier provided before the first switch array.

In an embodiment, at least one optical switch comprises a second optical amplifier provided after the second switch array.

An optical amplifier may not be needed if there are four directions or less, since loss in the optical switches may be acceptable. Adding an optical amplifier may increase the number of directions to above four.

In an embodiment, each optical amplifier is one of a semiconductor optical amplifier and an erbium doped fibre amplifier.

In an embodiment, the optical switch further comprises a switch controller arranged selectively to generate and transmit a drop control signal, an optical filter control signal and an add control signal. The drop control signal comprises instructions to cause each switch element of the first switch array having a resonance wavelength corresponding to the wavelength of an optical signal to be dropped to enter the active state. The optical filter control signal comprises instructions to cause each switch element having a resonance wavelength corresponding to the wavelength of an optical signal not to be transmitted to the respective output port to enter the active state. The add control signal comprises instructions to cause each switch element of the second switch array having a resonance wavelength corresponding to the wavelength of an optical signal to be added to enter the active state.

In an embodiment, the switch controller is arranged to configure the said control signals to avoid contentions between optical signals of the same wavelength. Coordination of the operation of the switch elements may enable symmetrical operation of each optical switch.

In an embodiment, the switch controller is arranged to receive a switching signal comprising switching information indicating each wavelength to be dropped, each wavelength to be added and a respective output direction for each wavelength to be bypassed. The switch controller may receive switching information from a control plane.

In an embodiment, the number of optical switch elements in each switch array is the same as the plurality of wavelengths. Each optical switch element may be dedicated to a single wavelength, giving the optical switch coloured operation.

In an embodiment, at least one optical switch comprises an optical combiner arranged to receive from the other said input ports optical signals at some of said wavelengths. The optical combiner is arranged to combine said optical signals and to deliver the combined optical signals to the second switch array.

In an embodiment, the optical switches are fabricated as photonic integrated devices. This may enable the optical switches to be manufactured at a low cost, less than the cost of conventional wavelength selective switches, and may therefore enable the OADM to be manufactured at a lower cost, which may make it economically viable to use the node within mobile backhaul networks.

In an embodiment, the optical add-drop multiplexer further comprises an electrical cross-point switch, optical to electrical signal conversion apparatus and electrical to optical signal conversion apparatus. The optical to electrical signal conversion apparatus is coupled between the optical switches and the electrical cross-point switch. The electrical to optical signal conversion apparatus is coupled between the electrical cross-point switch and the optical switches.

The electrical cross-point switch may enable the node to operate with colourless and directionless behaviour. The electrical cross-point switch may add flexibility to the node, by cross-connecting signals in the electrical domain.

In an embodiment, the optical add-drop multiplexer comprises a controller arranged in communication with the switch controller of each optical switch. The controller may enable coordination of the optical switches and their respective switch elements, and may avoid contentions between optical channels of the same wavelength.

In an embodiment, the controller is arranged to receive a routing signal comprising routing information indicating each wavelength to be dropped, each wavelength to be added and a respective output direction for each wavelength to be bypassed.

In an embodiment, the communication network node comprises a packet switch connected to the electrical cross-point switch.

A fourth aspect of the invention provides an optical communication network comprising a communication network node and a plurality of optical links. The communication network node comprises an optical add-drop multiplexer. The optical add-drop multiplexer comprises a plurality of optical switches. Each optical switch comprises a plurality of input ports, a plurality of output ports, a plurality of drop ports, a plurality of add ports, a first switch array, a plurality of optical filters and a second switch array.

The input ports are each arranged to receive optical signals from a different one of a plurality of directions. The output ports are each arranged to output optical signals to a different one of the plurality of directions. The first switch array is arranged to receive from a first said input port optical signals at a plurality of wavelengths. The first switch array comprises a plurality of switch elements each arranged to selectively direct optical signals at a different one of said wavelengths to a respective drop port. The optical filters are each arranged to receive from the first input port optical signals having wavelengths to be bypassed by the optical switch. Each optical filter is arranged to transmit to a respective one of the output ports optical signals at different ones of said wavelengths. The second switch array is arranged to receive from the other said input ports optical signals at some of said wavelengths. The second switch array comprises a plurality of switch elements each arranged to selectively add optical signals received from a respective add port at a different one of others of said wavelengths.

The architecture of the optical switches enables a multi-directional node to be provided which may meet the needs of mobile backhaul networks and which may be manufactured at a cost acceptable for with this network segment, where the large number of nodes imposes a limit on the cost per node. The node architecture may enable at least 1:1 protection switching to be implemented in the network.

In an embodiment, the communication network has a ring topology. In an embodiment, the communication network comprises two ring networks and the node is arranged to interconnect the two ring networks. A failure recovery scheme comprising 1:1 protection switching may be implemented in the network.

In an embodiment, the communication network comprises a plurality of nodes and the nodes and the optical links are arranged in a meshed topology. The use of a mesh, instead of rings, may enable more sophisticated recovery schemes to be used in the network, resilient to multiple failures or with some level of resource sharing.

In an embodiment, the communication network comprises 3-ways nodes and 4-ways nodes. Each 3-way node comprises an OADM having three input directions and three output directions. Each 4-way node comprises an OADM having four input directions and four output directions. Using a mix of 3-way and 4-way nodes may enable full mesh connectivity.

In an embodiment, each optical filter comprises a plurality of switch elements. Each switch element of each optical filter is arranged to selectively transmit optical signals at a different one of said wavelengths to be output at the respective output port.

Using switch elements to form the optical filters may enable the optical switches to be constructed using a minimum number of different optical devices, which may simplify the manufacturing process and may minimise the cost of the node.

In an embodiment, each switch element comprises an optical resonator and a control element. Each optical resonator has a respective preselected resonance wavelength. Each optical resonator has an active state and an inactive state. In the active state, each optical resonator acts on optical signals at its respective resonance wavelength. In the inactive state, the optical resonator does not act on optical signals at any of the plurality of wavelengths. The control element is arranged to receive a respective control signal configured to cause it to switch the optical resonator between the active and inactive states. In the active state the switch elements of the first switch array couple optical signals to the respective drop port. In the active state the switch elements of the second switch array add optical signals received from the respective add port to the optical signals received from the other input ports. In the active state the switch elements of the optical filters remove optical signals at wavelengths that are not to be output from their respective output port.

An optical resonator based switch element, which does not act on optical signals having bypass wavelengths, may enable transparent and energy efficient optical bypass of express channels by the node.

In an embodiment, the resonance wavelength of each optical resonator is selected from a respective preselected wavelength range.

In an embodiment, the optical resonator is a micro-ring resonator. Use of micro-ring resonators may give the OADM optical coloured operation of the drop and add ports, and may enable photonic integrated fabrication of the optical switches, minimising cost, power consumption and footprint of the node.

In an embodiment, the optical resonator is one of a magneto-optical resonator and an electro-optic resonator.

In an embodiment, at least one optical switch comprises an optical splitter, and the first switch array is provided between the first input and the optical splitter and the optical filters are provided after the optical splitter. The optical splitter is arranged to receive optical signals that have not been dropped by the first switch array, the optical splitter is arranged to split each said optical signal into a plurality of replica optical signals and the optical splitter is arranged to deliver a respective replica optical signal to each optical filter.

Locating the first switch array before the optical splitter may ensure that optical signals that are dropped have the maximum available optical power and may ensure that only optical signals at wavelengths to be bypassed, express optical channels, are transmitted to the optical filters for routing to the respective output port. By delivering a replica of each of the optical signals that have not been dropped, i.e. those which are to be bypassed by the optical switch, any of the optical signals being bypassed can be output to any of the output ports. The node may therefore provide directionless routing of bypass optical signals.

In an embodiment, at least one optical switch comprises an optical splitter and the first switch array and the optical filters are provided after the optical splitter. The optical splitter is arranged to receive the optical signals from the first input port, the optical splitter is arranged to split each said optical signal into a plurality of replica optical signals and the optical splitter is arranged to deliver a respective replica optical signal to each optical filter and to the first switch array. The first switch array is arranged additionally to operate as one of the optical filters, also dropping optical signals which are not to be output to its respective output port.

Configuring the first switch array both to couple optical signals to be dropped to their respective drop port and to couple optical signals which are not to be output to its respective output port out of the respective replica optical signals may enable the optical switches to be constructed with fewer optical devices, in particular fewer switch elements. This may simplify manufacture of the OADM and may reduce its cost.

In an embodiment, the optical switches each comprise at least three input ports and the same number of output ports. Each input port is arranged to receive optical signals from a different one of the at least three directions. Each output port is arranged to output optical signals to a different one of the said directions. A mix of 3-ways nodes and 4-ways nodes may provide full mesh connectivity.

In an embodiment, at least one optical switch comprises a first optical amplifier provided before the first switch array.

In an embodiment, at least one optical switch comprises a second optical amplifier provided after the second switch array.

An optical amplifier may not be needed if there are four directions or less in the node, since loss in the optical switches may be acceptable. Adding an optical amplifier may increase the number of directions to above four.

In an embodiment, each optical amplifier is one of a semiconductor optical amplifier and an erbium doped fibre amplifier.

In an embodiment, the optical switch further comprises a switch controller arranged selectively to generate and transmit a drop control signal, an optical filter control signal and an add control signal. The drop control signal comprises instructions to cause each switch element of the first switch array having a resonance wavelength corresponding to the wavelength of an optical signal to be dropped to enter the active state. The optical filter control signal comprises instructions to cause each switch element having a resonance wavelength corresponding to the wavelength of an optical signal not to be transmitted to the respective output port to enter the active state. The add control signal comprises instructions to cause each switch element of the second switch array having a resonance wavelength corresponding to the wavelength of an optical signal to be added to enter the active state.

In an embodiment, the switch controller is arranged to configure the said control signals to avoid contentions between optical signals of the same wavelength. Coordination of the operation of the switch elements may enable symmetrical operation of each optical switch.

In an embodiment, the switch controller is arranged to receive a switching signal comprising switching information indicating each wavelength to be dropped, each wavelength to be added and a respective output direction for each wavelength to be bypassed. The switch controller may receive switching information from a control plane.

In an embodiment, the number of optical switch elements in each switch array is the same as the plurality of wavelengths. Each optical switch element may be dedicated to a single wavelength, giving the optical switch coloured operation.

In an embodiment, at least one optical switch comprises an optical combiner arranged to receive from the other said input ports optical signals at some of said wavelengths. The optical combiner is arranged to combine said optical signals and to deliver the combined optical signals to the second switch array.

In an embodiment, the optical switches are fabricated as photonic integrated devices. This may enable the optical switches to be manufactured at a low cost, less than the cost of conventional wavelength selective switches, and may therefore enable the OADM to be manufactured at a lower cost, which may make it economically viable to use the node within mobile backhaul networks.

In an embodiment, the optical add-drop multiplexer further comprises an electrical cross-point switch, optical to electrical signal conversion apparatus and electrical to optical signal conversion apparatus. The optical to electrical signal conversion apparatus is coupled between the optical switches and the electrical cross-point switch. The electrical to optical signal conversion apparatus is coupled between the electrical cross-point switch and the optical switches.

The electrical cross-point switch may enable the node to operate with colourless and directionless behaviour. The electrical cross-point switch may add flexibility to the node, by cross-connecting signals in the electrical domain.

In an embodiment, the optical add-drop multiplexer comprises a controller arranged in communication with the switch controller of each optical switch. The controller may enable coordination of the optical switches and their respective switch elements, and may avoid contentions between optical channels of the same wavelength.

In an embodiment, the controller is arranged to receive a routing signal comprising routing information indicating each wavelength to be dropped, each wavelength to be added and a respective output direction for each wavelength to be bypassed.

In an embodiment, the communication network node comprises a packet switch connected to the electrical cross-point switch.

Embodiments of the invention will now be described, by way of example only, with reference to the accompanying drawings.

DETAILED DESCRIPTION

Figure 1:
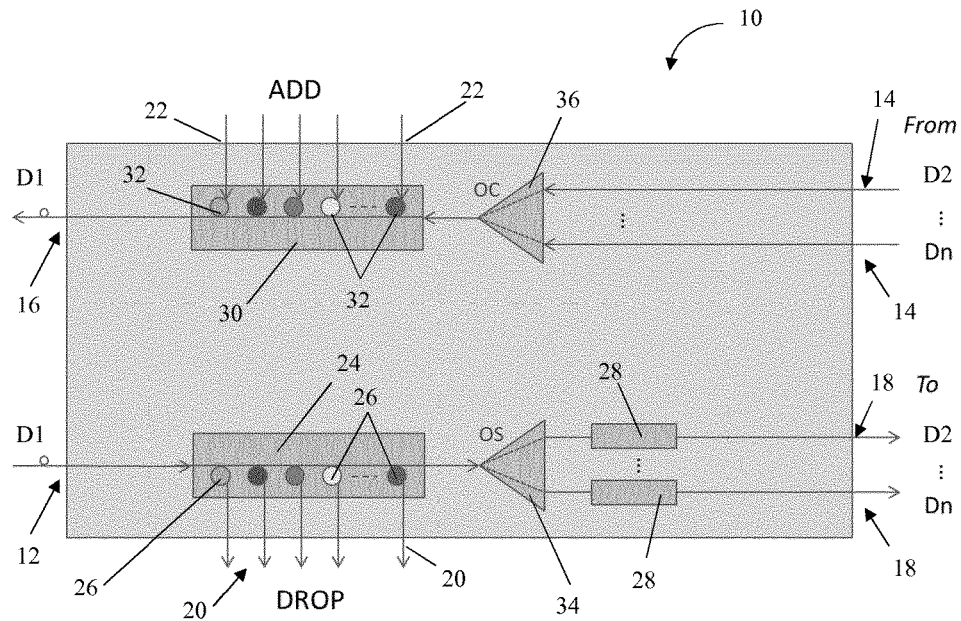
FIG. 1 is a schematic representation of an optical switch according to a first embodiment of the invention.

Referring to FIG. 1, a first embodiment of the invention provides an optical switch 10 comprising a plurality of input ports 12, 14, a plurality of output ports 16, 18, a plurality of drop ports 20, a plurality of add ports 22, a first switch array 24, a plurality of optical filters 28, a second switch array 30, and optical splitter 34 and an optical combiner 36.

The input ports 12, 14 are each arranged to receive optical signals from a different one of a plurality of directions. A first input port 12 is arranged to receive optical signals from one direction, D1. The remaining input ports 14 are each arranged to receive optical signals from a different one of the other directions, D2 to Dn. The output ports 16, 18 are each arranged to output optical signals to a different one of the directions. A first output port 16 is arranged to output optical signals to the first direction, D1. The remaining output ports 18 are each arranged to output optical signals to a different one of the other directions, D2 to Dn.

The first switch array 24 is arranged to receive optical signals from the first input port 12, the optical signals each having a different one of a plurality of wavelengths. The first switch array comprises a plurality of switch elements 26. Each switch element is arranged to operate at a different one of the wavelengths and is arranged to selectively direct optical signals at its respective wavelength to the respective drop port 20.

The optical filters 28 are each arranged to receive the optical signals transmitted by the first switch array 24. These are optical signals which have wavelengths which are to be bypassed by the optical switch, bypass wavelengths, and which have therefore not been directed to a drop port 20 by the first switch array 24. The optical splitter receives the optical signals at bypass wavelengths and splits each optical signal to form a plurality of replica signals. Each optical filter therefore receives a replica of the optical signals transmitted by the first switch array 24. Each optical filter is connected to a respective one of the output ports 18, D1 to Dn. Each optical filter is arranged to transmit optical signals at different ones of the bypass wavelengths.

The second switch array 30 is arranged to receive optical signals from the other input ports 14. These optical signals are at some of the plurality of wavelengths. The optical combiner 36 receives the optical signals from the other input ports 14, combines them and delivers the combined optical signals to the second switch array. The second switch array comprises a plurality of switch elements 32. Each switch element 32 is arranged to selectively add optical signals received from a respective add port at a different one of the plurality of wavelengths, that is at a wavelength at which an optical signal has not been received from the other input ports 14.

Figure 2:
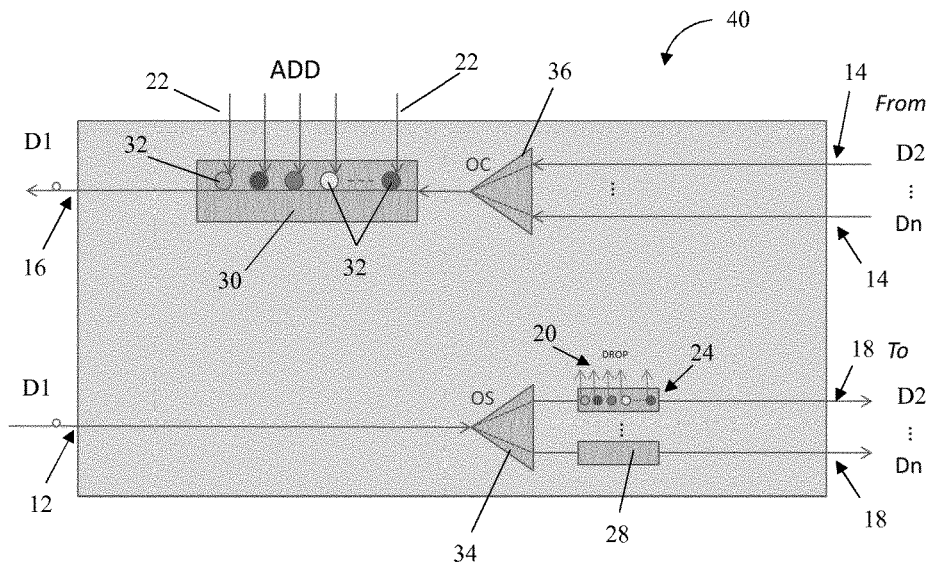
FIG. 2 is a schematic representation of an optical switch according to a second embodiment of the invention.

A second embodiment of the invention provides an optical switch 40 as shown in FIG. 2. The optical switch 40 of this embodiment is similar to the optical switch 10 shown in FIG. 1 with the following modifications. The same reference numbers are retained for corresponding features.

In this embodiment, the first switch array 24 is provided after the optical splitter 34. The optical splitter receives the optical signals from the first input port 12 and splits each optical signal into a plurality of replicas. The first switch array 24 and each of the optical filters 28 receive a replica of all of the optical signals received from the first input port.

The first switch array 24 arranged both to direct optical signals at wavelengths to be dropped to the respective drop port and also to remove optical signals at wavelengths which are not to be output to the output port 18 for direction D2.

Figure 3:
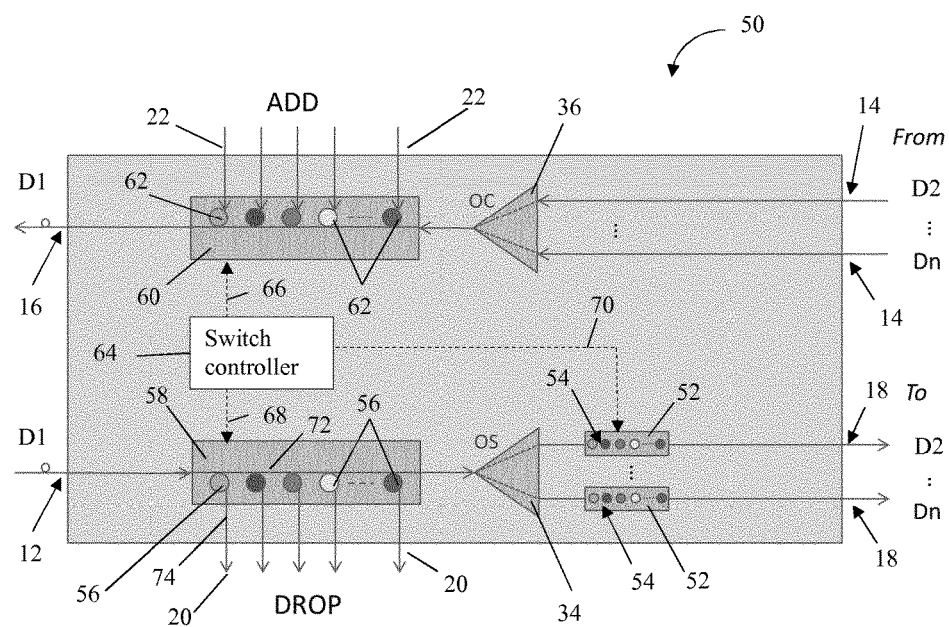
FIG. 3 is a schematic representation of an optical switch according to a third embodiment of the invention, insets (a) and (b) are schematic representations of switch elements of the switch of FIG. 3.
Figure 3:
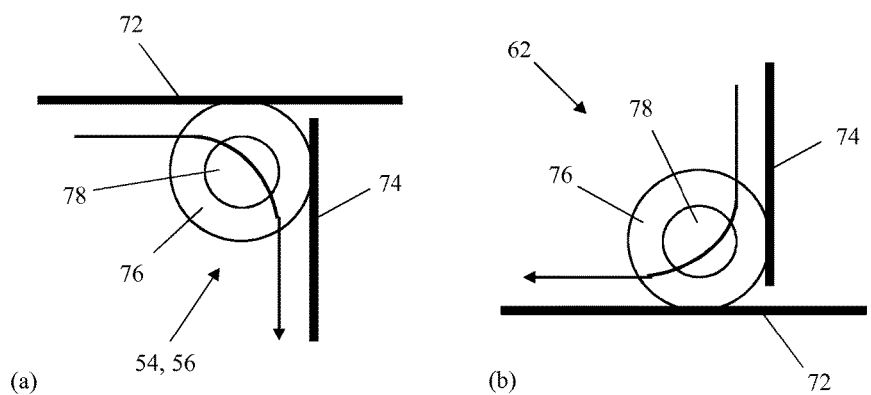

A third embodiment of the invention provides an optical switch 50 as shown in FIG. 3. The optical switch 50 of this embodiment is similar to the optical switch 10 shown in FIG. 1 with the following modifications. The same reference numbers are retained for corresponding features.

In this embodiment, each optical filter 52 comprises a plurality of switch elements 54. Each switch element 54 is arranged to selectively transmit optical signals at a different one of said wavelengths to be output at the respective output port.

Each switch element 56, 62 of the first switch array 58 and the second switch array 60, and each switch element 54 comprises an optical resonator 76 and a control element 78, as shown in inserts (a) and (b) of FIG. 3. In this embodiment, the optical resonator 76 is a micro-ring resonator which is configured to have a preselected resonance wavelength at which it acts on optical signals. Each optical resonator 76 is able to resonate at a respective range of wavelengths. The resonance wavelength of each optical resonator 76 is selected from its respective wavelength range. The resonance wavelength of each optical resonator may be tuned within its respective wavelength range. This wavelength tuneability may be used to compensate for production tolerance, for example, to ensure that each optical resonator 76 is configured to resonate at a respective one of the plurality of wavelengths at which optical signals will be received.

Each optical resonator 76 has an active state and an inactive state. In the active state, each optical resonator acts on optical signals at its respective resonance wavelength, corresponding to the wavelength of the switch element. In their inactive states, the resonance wavelengths of the optical resonators do not match any of the wavelengths of the optical signals and the optical resonators therefore do not act on any of the optical signals. The resonance wavelength of the micro-ring resonator 76 is shifted in order to change between the inactive state and the active state. The resonance wavelength may be shifted by applying heat, a magnetic field or an electric field to the micro-ring resonator. In this embodiment, the control element 78 is a heater which is arranged to apply heat to the micro-ring resonator to cause it's wavelength to shift, to cause the micro-ring resonator to switch from the inactive state to the active state. Switching from the active state to the inactive state is effected by causing the heater to turn off, allowing the micro-ring resonator to cool down and its wavelength to shift back. Each control element 78 is arranged to receive a control signal to cause it to heat up, to switch the micro-ring resonator into the active state, and the control signal ceases when the control element 78 is required to cool back down, to return the micro-ring resonator to the inactive state.

The switch elements 56 of the first switch array, when in the active state, couple optical signals to the respective drop port, as indicated by the arrow in FIG. 3(*a*). The switch elements 62 of the second switch array, when in the active state, add optical signals received from the respective add port to the optical signals received from the optical combiner 36, as indicated by the arrow in FIG. 3(*b*). The switch elements 54 of the optical filters, when in the active state, remove optical signals at wavelengths that are not to be output from their respective output port.

The optical switch 50 also comprises a switch controller 64 which is arranged selectively to generate and transmit a drop control signal 68 comprising instructions to cause each switch element 56 of the first switch array 24 having the wavelength of an optical signal to be dropped to enter the active state. The switch controller 64 is arranged selectively to generate and transmit at least one optical filter control signal 70. The optical filter control signal 70 comprises instructions to cause each switch element 54 having the wavelength of an optical signal which is not to be transmitted to its respective output port 18 to enter the active state. One optical filter control signal may be generated and transmitted comprising instructions for all the optical filters, or a respective optical filter control signal may be generated and transmitted for each optical filter. The switch controller 64 is arranged selectively to generate and transmit an add control signal 66 comprising instructions to cause each switch element 62 of the second switch array 60 having the wavelength of an optical signal to be added to enter the active state. It will be appreciated that where no optical signal is to be dropped, no drop control signal is required, where no optical signal is to be added, no add control signal is required, and where all of the optical signals received at an optical filter are to be transmitted, no optical filter control signal is required for that optical filter or where a single optical filter control signal is transmitted, no instructions are required for that filter.

The switch controller 64 is arranged to configure the control signals to avoid contentions between optical signals of the same wavelength. The switch controller 64 is arranged to coordinate operation of switch elements to avoid contentions between optical channels and to achieve full symmetry in the two opposite directions (as orientated in the drawing). The switch controller may be arranged to receive switching information from a control plane of a communication network.

The optical switch 50 may be fabricated as a photonic integrated device.

When a plurality of optical signals, each having a different wavelength, that is to say wavelength division multiplexed, WDM, signals coming from direction D1 enters the optical switch 50, they propagate along a straight waveguide 72 while traversing the array of switch elements 56. When a WDM signal arrives close to the micro-ring 76 designed to resonate at a wavelength corresponding to its wavelength, if the switch element 56 is in the active state, the optical signal is coupled to the micro-ring resonator and is directed to the respective drop port 20. Because of the wavelength selectivity of the micro-ring resonator based switch elements 56, if the corresponding micro-ring resonator is not in the active state the optical signal at the corresponding wavelength proceeds towards the optical splitter 34. The optical splitter receives all of the optical signals for which the corresponding micro-ring resonator is in the inactive state. The optical splitter splits each optical signal to create a plurality of replica optical signals which are distributed to the optical filters. The optical filters have the function to select respectively the set of wavelengths to be routed towards each of directions D2 to Dn. The wavelengths that are not selected by the optical filters are discarded.

In the opposite direction, signals coming from the other directions, D2 to Dn, are combined by the optical combiner 36 and enter the second switch array 60 where they are multiplexed with the wavelengths to be added. Optical signals at wavelengths to be added are sent to the corresponding color-coded micro-ring resonators 76, and by switching the micro-ring resonators into the active state, the optical signals to be added are coupled to the micro-ring resonator and into the waveguide 72 of the second switch array.

Figure 4:
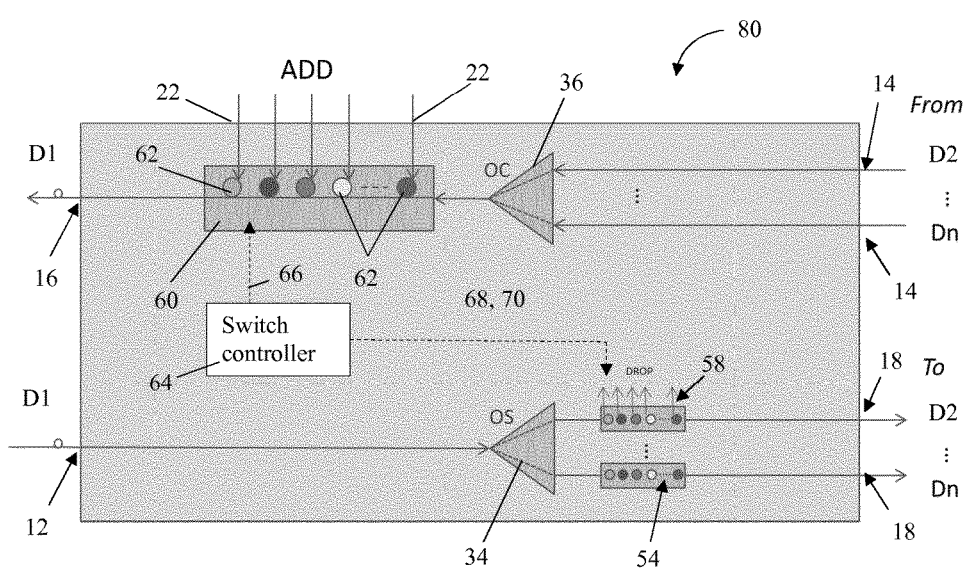
FIG. 4 is a schematic representation of an optical switch according to a fourth embodiment of the invention.

A fourth embodiment of the invention provides an optical switch 80 as shown in FIG. 4. The optical switch 80 of this embodiment is similar to the optical switch 40 shown in FIG. 2 with the following modifications. The same reference numbers are retained for corresponding features.

In this embodiment, the optical switch 80 comprises a switch controller 64, as described above in relation to FIG. 3.

The optical switch 80 may be fabricated as a photonic integrated device.

Figure 5:
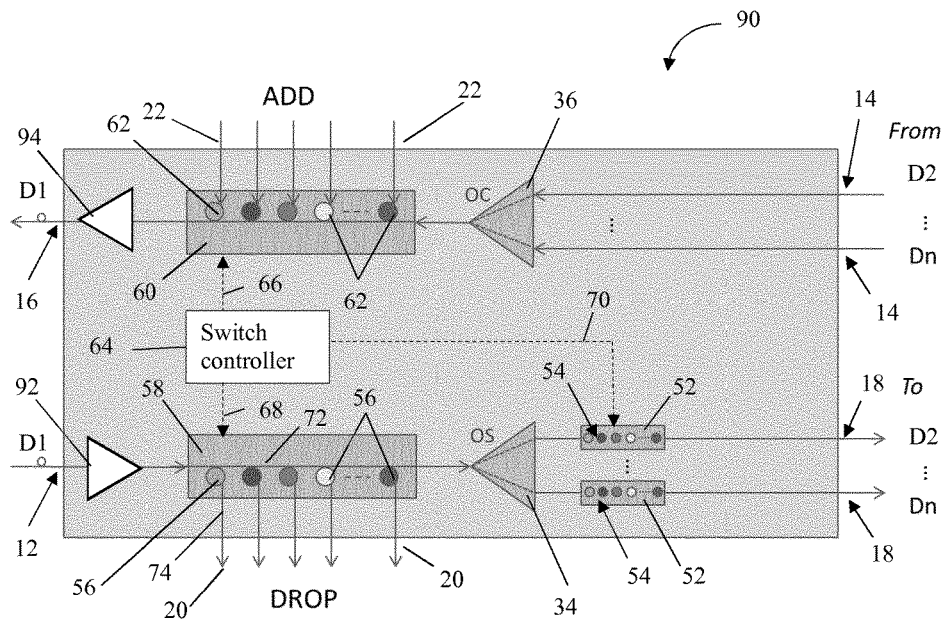
FIG. 5 is a schematic representation of an optical switch according to a fifth embodiment of the invention.

A fifth embodiment of the invention provides an optical switch 90 as shown in FIG. 5. The optical switch 90 of this embodiment is similar to the optical switch 50 shown in FIG. 3 with the following modifications. The same reference numbers are retained for corresponding features.

In this embodiment, the optical switch 90 comprises a first optical amplifier 92 provided before the first switch array 58 and a second optical amplifier 94 provided after the second switch array 60. The optical switch 90 is fabricated as a photonic integrated device and each of the optical amplifiers 92, 94 is a semiconductor optical amplifier, SOA.

An optical amplifier may not be required if there are four directions or less, since the loss in the optical components, the switch elements, optical combiner and optical splitter, may be acceptable. Adding the optical amplifiers 92, 94 may increase the number of directions to above four.

Figure 6:
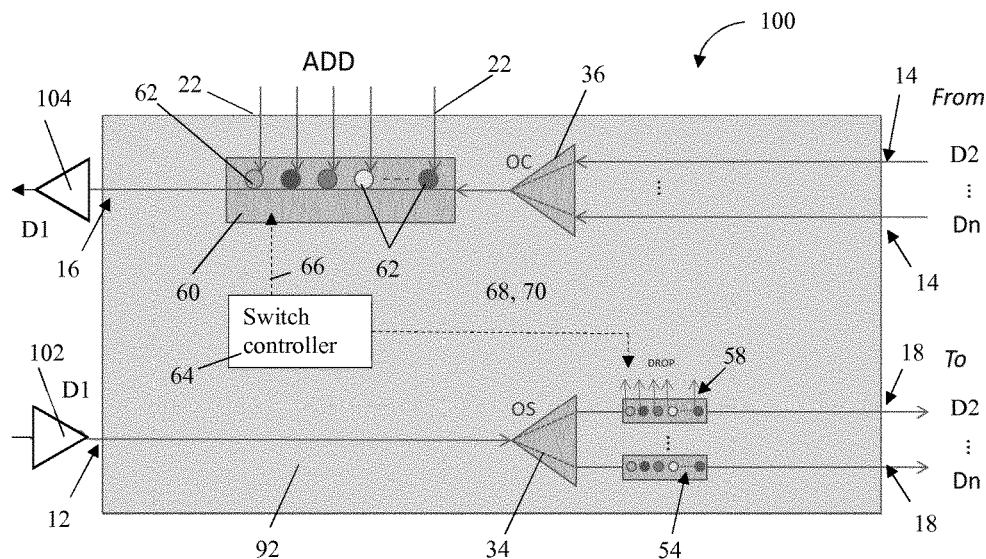
FIG. 6 is a schematic representation of an optical switch according to a sixth embodiment of the invention.

A sixth embodiment of the invention provides an optical switch 100 as shown in FIG. 6. The optical switch 100 of this embodiment is similar to the optical switch 90 shown in FIG. 5 with the following modifications. The same reference numbers are retained for corresponding features.

In an embodiment, each optical amplifier 102, 104 is an erbium doped fibre amplifier, EDFA, and is provided externally to the photonic integrated circuit of the rest of the optical switch 100.

Figure 7:
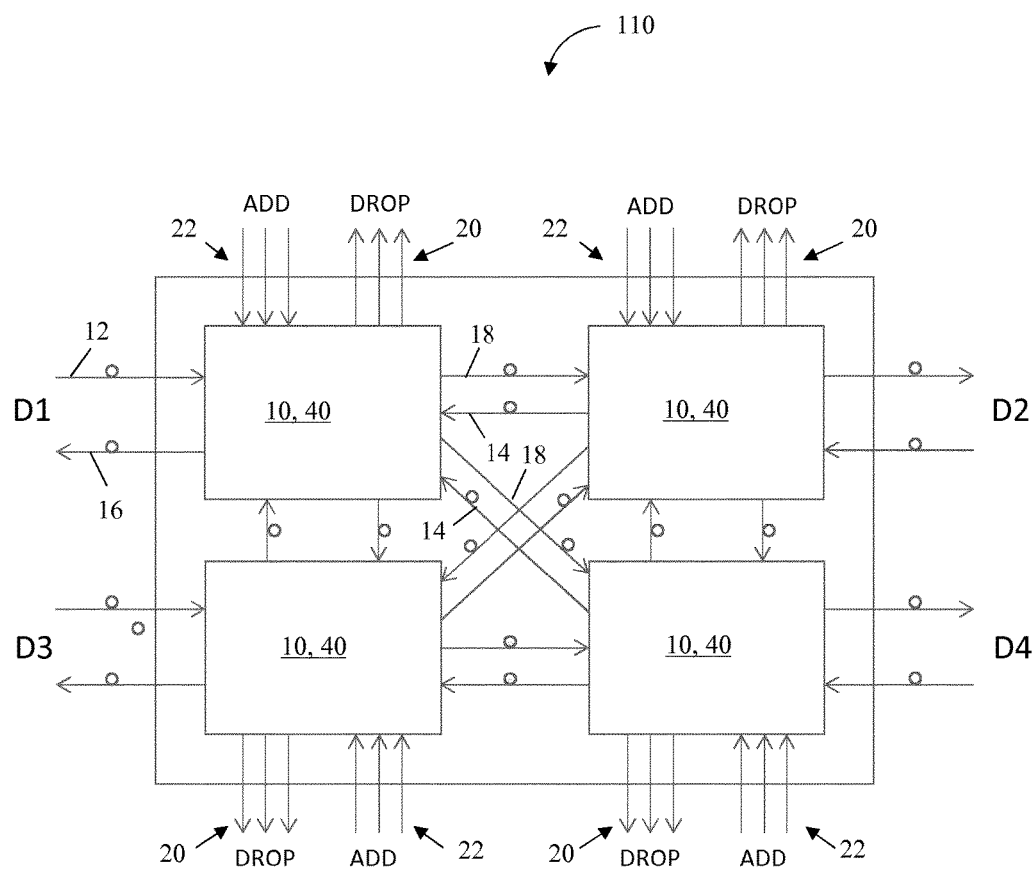
FIG. 7 is a schematic representation of an optical add-drop multiplexer according to a seventh embodiment of the invention.

Referring to FIG. 7, a seventh embodiment of the invention provides an optical add-drop multiplexer, OADM, 110 comprising a plurality of optical switches 10, 40 as described above in relation to FIGS. 1 and 2.

Each optical switch 10, 40 has receives optical signals from four input directions, D1, D2, D3, D4 and outputs optical signals to the four directions.

Figure 8:
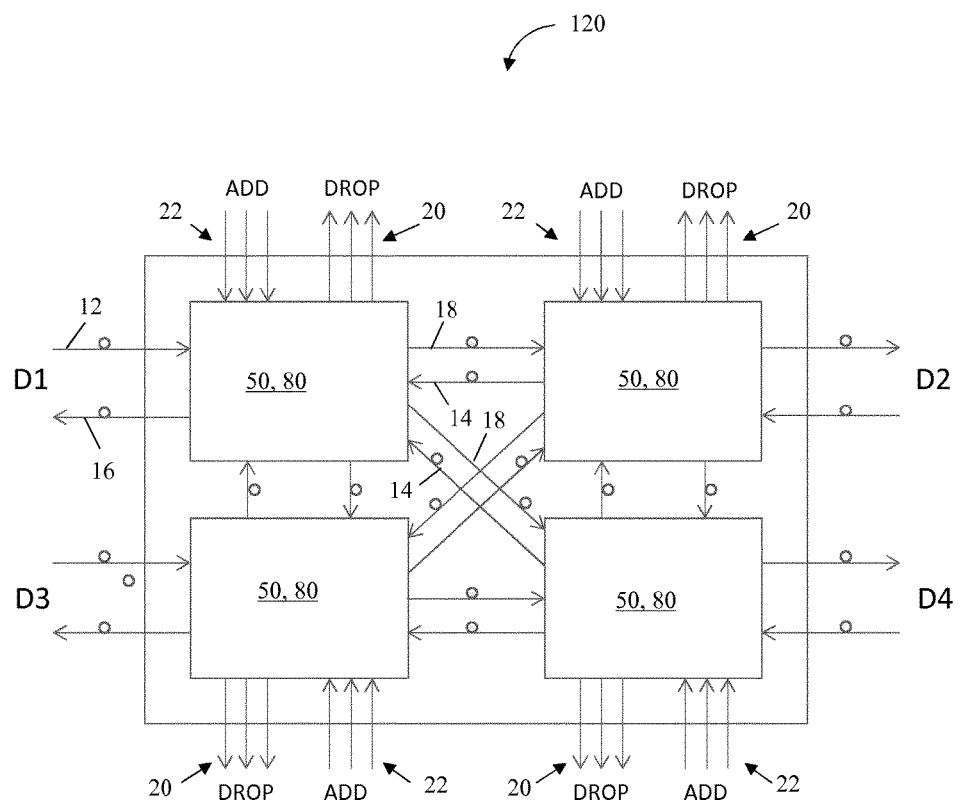
FIG. 8 is a schematic representation of an optical add-drop multiplexer according to an eighth embodiment of the invention.

FIG. 8 shows an OADM 120 according to an eighth embodiment of the invention. The OADM 120 comprises a plurality of optical switches 50, 80 as described above in relation to FIGS. 3 and 4.

Figure 9:
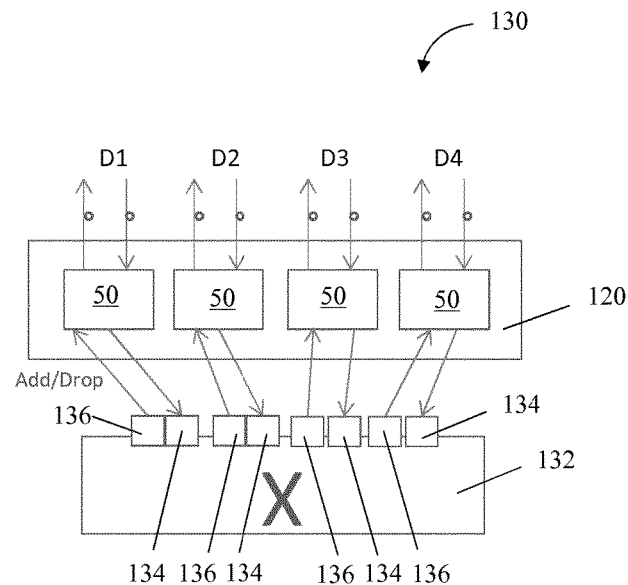
FIG. 9 is a schematic representation of an optical add-drop multiplexer according to a ninth embodiment of the invention.

FIG. 9 shows a reconfigurable OADM, ROADM, 130 according to a ninth embodiment of the invention. The ROADM 130 comprises an OADM 120 as shown in FIG. 8, with the following modifications. The same reference numbers are retained for corresponding features.

In this embodiment, each optical switch 50 of the ROADM is as shown in FIG. 3 but it will be appreciated that the optical switches 80, 90, 100 shown in FIGS. 4 to 6 may alternatively be used.

The ROADM 130 additionally comprises an electrical cross-point switch 132, optical to electrical, O-E, signal conversion apparatus 134 and electrical to optical, E-O, signal conversion apparatus 136. The O-E signal conversion apparatus is coupled between the optical switches 50 and the electrical cross-point switch. The E-O apparatus is coupled between the electrical cross-point switch and the optical switches.

The electrical cross-point switch 132 enables the ROADM 130 to be reconfigured, adding flexibility to the node, by cross-connecting signals in the electrical domain, allowing optical signals at any of the wavelengths to be output to any direction, N, S, E, W.

Figure 10:
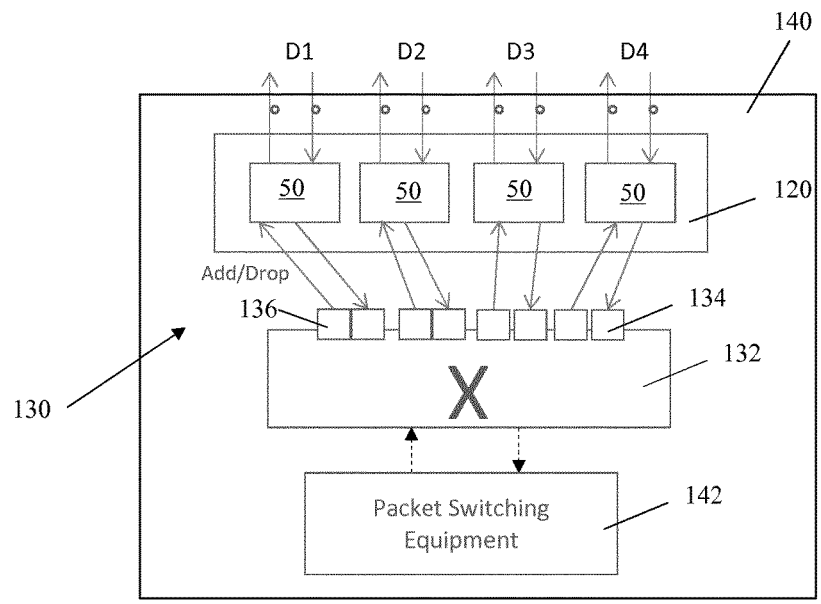
FIG. 10 is a schematic representation of communication network node according to a tenth embodiment of the invention.

FIG. 10 shows a communication network node 140 according to a tenth embodiment of the invention. The node 140 comprises a ROADM 130 as shown in FIG. 9 and packet switching equipment 142. A ROADM 110, 120 as shown in FIGS. 7 and 8 may alternatively be used.

The electrical cross-point switch 132 enables the node 140 to be reconfigured, by cross-connecting signals in the electrical domain. Electrical signals carrying packets of data to be added at the node 140 can be added at any wavelength and output to any direction, enabling the node to have both colourless and directionless operation.

Figure 11:
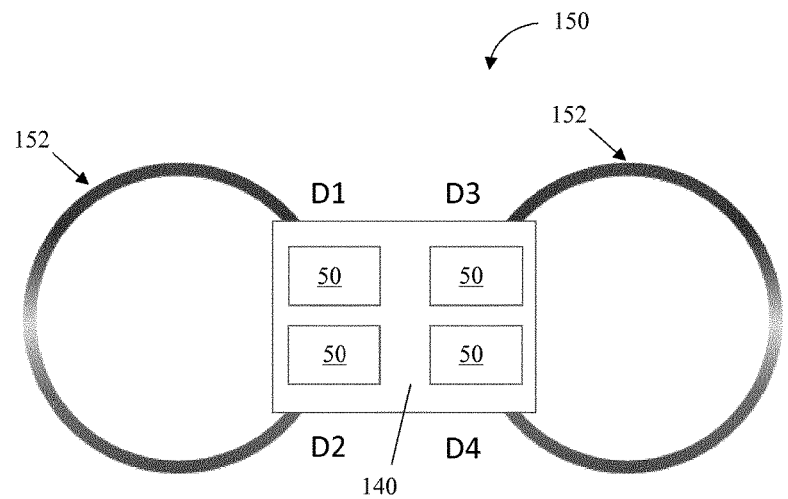
FIG. 11 is a schematic representation of communication network according to an eleventh embodiment of the invention.

An optical communication network 150 according to an eleventh embodiment of the invention is shown in FIG. 11. The network 150 comprises a node 140 as shown in FIG. 10 and a plurality of optical links 152.

The optical links 152 are arranged as two ring networks, with the node 140 forming an interconnection between the rings.

The node 140 may alternatively comprise a ROADM 110, 120 as shown in FIGS. 7 and 8.

Figure 12:
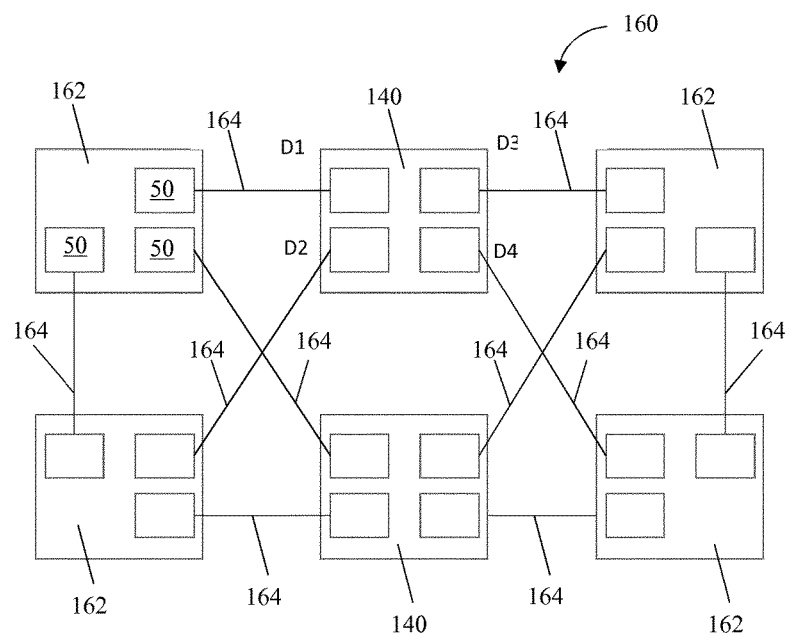
FIG. 12 is a schematic representation of communication network according to an twelfth embodiment of the invention.

An optical communication network 160 according to a twelfth embodiment of the invention is shown in FIG. 12. The network 160 comprises a plurality of nodes 140 as shown in FIG. 10, a plurality of nodes 162, and a plurality of optical links 164. The nodes 140 may alternatively comprise a ROADM 110, 120 as shown in FIGS. 7 and 8.

There are two nodes 140 as shown in FIG. 10, each having four directions, D1-D4, referred to as 4-way nodes. There are four nodes 162 which are similar to the nodes 140 shown in FIG. 10 but which have only three optical switches 50 and three directions, referred to as 3-way nodes. The nodes 162 may alternatively comprise a ROADM 110, 120 as shown in FIGS. 7 and 8.

Only six nodes 140, 162 are shown in the Figure but it will be appreciated that a larger number of nodes may be used. The nodes 140, 162 and the optical links 164 are arranged in a mesh topology. Using a mixture of 3-way and 4-way nodes may enable the network 160 to have full mesh connectivity.

The invention claimed is:

1. An optical switch comprising:
a plurality of input ports each arranged to receive optical signals from a different one of a plurality of directions;
a plurality of output ports each arranged to output optical signals to the different one of the plurality of directions;
a plurality of drop ports;
a plurality of add ports;
a first switch array arranged to receive from a first said input port optical signals at a plurality of wavelengths, the first switch array comprising a plurality of switch elements each arranged to selectively direct optical signals at a different one of said plurality of wavelengths to a different one of the plurality of drop ports;
a plurality of optical filters each arranged to receive the optical signals having wavelengths that are not selectively dropped by the plurality of switch elements of the first switch array and passed through the first switch array, each optical filter arranged to transmit to a respective one of the output ports optical signals at different ones of said wavelengths passed through the first switch array; and
a second switch array arranged to receive from the other said input ports optical signals at some of said plurality of wavelengths, the second switch array comprising a plurality of switch elements each arranged to selectively add optical signals received from a different one of the plurality of add ports at a different one of others of said plurality of wavelengths.

2. An optical switch as claimed in claim 1, wherein each optical filter comprises a plurality of switch elements each arranged to selectively transmit optical signals at a different one of said wavelengths to be output at the respective output port.

3. An optical switch as claimed in claim 1, wherein each switch element comprises an optical resonator and a control element, each optical resonator having a respective preselected resonance wavelength and each optical resonator having an active state in which said optical resonator acts on optical signals at its respective resonance wavelength and an inactive state in which said optical resonator does not act on optical signals at any of the plurality of wavelengths, and the control element is arranged to receive a respective control signal configured to cause it to switch the optical resonator between said states, and wherein in the active state the switch elements of the first switch array couple optical signals to the respective drop port, the switch elements of the second switch array add optical signals received from the respective add port to the optical signals received from the other input ports, and the switch elements of the optical filters remove optical signals at wavelengths that are not to be output from their respective output port.

4. An optical switch as claimed in claim 3, wherein the optical resonator is one of a micro-ring resonator, a magneto-optical resonator and an electro-optic resonator.

5. An optical switch as claimed in claim 1, wherein:
the optical switch comprises an optical splitter,
the first switch array is provided between and coupled to each of the first input and the optical splitter,
the optical filters are provided after and coupled to the optical splitter,
the optical splitter is arranged to receive from the first switch array the optical signals having the wavelengths that have not been selectively dropped by the first switch array and thus have passed through the first switch array, and
the optical splitter is arranged to split each said optical signal into a plurality of replica optical signals and to deliver a respective replica optical signal to each of the optical filters.

6. An optical switch as claimed in claim 1, wherein the optical switch comprises an optical splitter and the first switch array and the optical filters are provided after the optical splitter, the optical splitter arranged to receive the optical signals from the first input port and arranged to split each said optical signal into a plurality of replica optical signals and to deliver a respective replica optical signal to each optical filter and to the first switch array, wherein the first switch array is arranged additionally to operate as one of the optical filters.

7. An optical switch as claimed in claim 3 and further comprising a switch controller arranged selectively to generate and transmit:
a drop control signal comprising instructions to cause each switch element of the first switch array having a resonance wavelength corresponding to the wavelength of an optical signal to be dropped to enter the active state;
at least one optical filter control signal comprising instructions to cause each switch element having a resonance wavelength corresponding to the wavelength of an optical signal to be dropped to enter the active state; and
an add control signal comprising instructions to cause each switch element of the second switch array having a resonance wavelength corresponding to the wavelength of an optical signal to be added to enter the active state.

8. An optical add-drop multiplexer comprising a plurality of optical switches, each optical switch comprising:
a plurality of input ports each arranged to receive optical signals from a different one of a plurality of directions;
a plurality of output ports each arranged to output optical signals to the different one of the plurality of directions;

a plurality of drop ports;

a plurality of add ports;

a first switch array arranged to receive from a first said input port optical signals at a plurality of wavelengths, the first switch array comprising a plurality of switch elements each arranged to selectively direct optical signals at a different one of said plurality of wavelengths to a different one of the plurality of drop ports;

a plurality of optical filters each arranged to receive the optical signals having wavelengths that are not selectively dropped by the plurality of switch elements of the first switch array and passed through the first switch array, each optical filter arranged to transmit to a respective one of the output ports optical signals at different ones of said wavelengths passed through the first switch array; and a second switch array arranged to receive from the other said input ports optical signals at some of said plurality of wavelengths, the second switch array comprising a plurality of switch elements each arranged to selectively add optical signals received from a different one of the plurality of add ports at a different one of others of said plurality of wavelengths.

9. An optical add-drop multiplexer as claimed in claim 8 and further comprising:

an electrical cross-point switch;

optical to electrical signal conversion apparatus coupled between the optical switches and the electrical cross-point switch; and electrical to optical signal conversion apparatus coupled between the electrical cross-point switch and the optical switches.

10. A communication network node comprising an optical add-drop multiplexer, the optical add-drop multiplexer comprising a plurality of optical switches, each optical switch comprising:

a plurality of input ports each arranged to receive optical signals from a different one of a plurality of directions;

a plurality of output ports each arranged to output optical signals to the different one of the plurality of directions;

a plurality of drop ports;

a plurality of add ports;

a first switch array arranged to receive from a first said input port optical signals at a plurality of wavelengths, the first switch array comprising a plurality of switch elements each arranged to selectively direct optical signals at a different one of said plurality of wavelengths to a different one of the plurality of drop ports;

a plurality of optical filters each arranged to receive the optical signals having wavelengths that are not selectively dropped by the plurality of switch elements of the first switch array and passed through the first switch array, each optical filter arranged to transmit to a respective one of the output ports optical signals at different ones of said wavelengths passed through the first switch array; and a second switch array arranged to receive from the other said input ports optical signals at some of said plurality of wavelengths, the second switch array comprising a plurality of switch elements each arranged to selectively add optical signals received from a different one of the plurality of add ports at a different one of others of said plurality of wavelengths.

* * * * *